United States Patent [19]
Ebihara et al.

[11] 4,190,892
[45] Feb. 26, 1980

[54] ZERO SUPPRESSING SYSTEM FOR ELECTRONIC DEVICE

[75] Inventors: Heihachiro Ebihara; Fukuo Sekiya, both of Tokorozawa; Takashi Yamada, Sayama, all of Japan

[73] Assignee: Citizen Watch Co., Ltd., Tokyo, Japan

[21] Appl. No.: 911,553

[22] Filed: May 31, 1978

[30] Foreign Application Priority Data

Jun. 7, 1977 [JP] Japan ............................ 52-66967

[51] Int. Cl.² .............................................. G06F 3/14
[52] U.S. Cl. .................................................. 364/711
[58] Field of Search ................................. 364/711, 900; 340/324 R

[56] References Cited

U.S. PATENT DOCUMENTS

| | | | |
|---|---|---|---|
| 3,449,726 | 6/1969 | Kawamoto et al. | 364/900 |
| 3,537,073 | 10/1970 | Sakoda et al. | 364/900 |
| 3,564,503 | 2/1971 | Kubo et al. | 364/900 |
| 3,662,346 | 5/1972 | Tada | 364/900 |
| 3,749,896 | 7/1973 | Munt | 364/711 |
| 3,815,098 | 6/1974 | Kimura et al. | 364/900 |
| 3,820,107 | 6/1974 | Niizawa et al. | 340/324 R |

*Primary Examiner*—David H. Malzahn
*Attorney, Agent, or Firm*—Frank J. Jordan

[57] ABSTRACT

An electronic device having means for display of data in digital form and means for suppression of non-significant zero digits, which comprises storage circuit means for storing and circulating said data, detection circuit means coupled to an output terminal of said storage circuit means for detecting zero value digits in said data, counter circuit means responsive to an output signal from said detection circuit means for counting the number of non-significant zero value digits in said data, and gate circuit means coupled between said storage circuit means and said display means responsive to an output signal of said counter circuit means for suppressing display of said non-significant zero value digits by said display means.

7 Claims, 7 Drawing Figures

| | D₉ | D₈ | D₇ | D₆ | D₅ | D₄ | D₃ | D₂ | D₁ |
|---|---|---|---|---|---|---|---|---|---|
| BI CYCLE | D₉ | D₈ | D₇ | D₆ | D₅ | D₄ | D₃ | D₂ | D₁ |
| COUNTER CONTENTS | 3 | 2 | 1 | 0 | 1 | 0 | 1 | 0 | 0 |
| BII CYCLE | | | D₉ | D₈ | D₇ | D₆ | D₅ | D₄ | D₃ D₂ | D₁ |
| COUNTER CONTENTS | | | | | 6 | 5 | 4 | 3 | 3 |
| BIII CYCLE | D₈ | D₇ | D₆ | D₅ | D₄ | D₃ | D₂ | D₁ | |
| COUNTER CONTENTS | 8 | 8 | 8 | 7 | | | | | |

ZERO SUPPRESSING SYSTEM FOR ELECTRONIC DEVICE

This invention relates to electronic devices having digital type means for displaying data, and in particular to circuit means whereby the number of elements required for suppressing the display of non-significant zeros can be significantly reduced.

In digital displays for electronic devices such as calculators, electronic wristwatches, etc., it is usually necessary to provide some means for preventing the display of non-significant leading zeros in the data which is transferred to the display. With the method of the present invention, it is possible to significantly reduce the number of circuit elements which are required to perform this function, which will be hereinafter abbreviated to "zero suppression." With the method of the present invention, data are stored in a recirculating type of shift register, referred to hereinafter as a calculation shift register, and are read out from the calculation shift register one digit at a time. As each digit is shifted out, it is checked by a detection circuit to find whether it represents a zero digit. If it does not, then a signal is generated which resets a counter. If the digit is zero, then the counter is incremented by one count. The maximum count of the counter is equal to the number of digits stored in the calculation shift register. When this checking process has been completed for all of the digits stored in the calculation shift register, then the shift register data is transferred, one digit at a time in serial form to a display register to be stored for display. During this transfer process, the data are passed through a logic gate which is controlled by the output from the counter. As each data digit is shifted through to the display register, the counter is incremented by one count for each digit. When the count reaches the maximum, then further inputs to increment the counter are inhibited, and the output signal from the counter acts to inhibit the transfer of digit data to the display register through the logic gate. This serves to perform suppression of non-significant zeros, since the count value stored in the counter at the end of the checking process described above is equal to the number of digits to be suppressed.

Means can also be provided whereby a leading zero which is positioned immediately to the left of the decimal point is not suppressed. This is often required, for clarity of display.

It is therefore an object of the present invention to provide improved means for suppressing the display of non-significant zero digits in an electronic device having digital type display means, whereby the number of circuit elements required to perform such suppression is significantly reduced.

Other objects, features and advantages of the present invention may be understood by the following description, when taken in conjunction with the accompanying figures, wherein.

Figure 1:
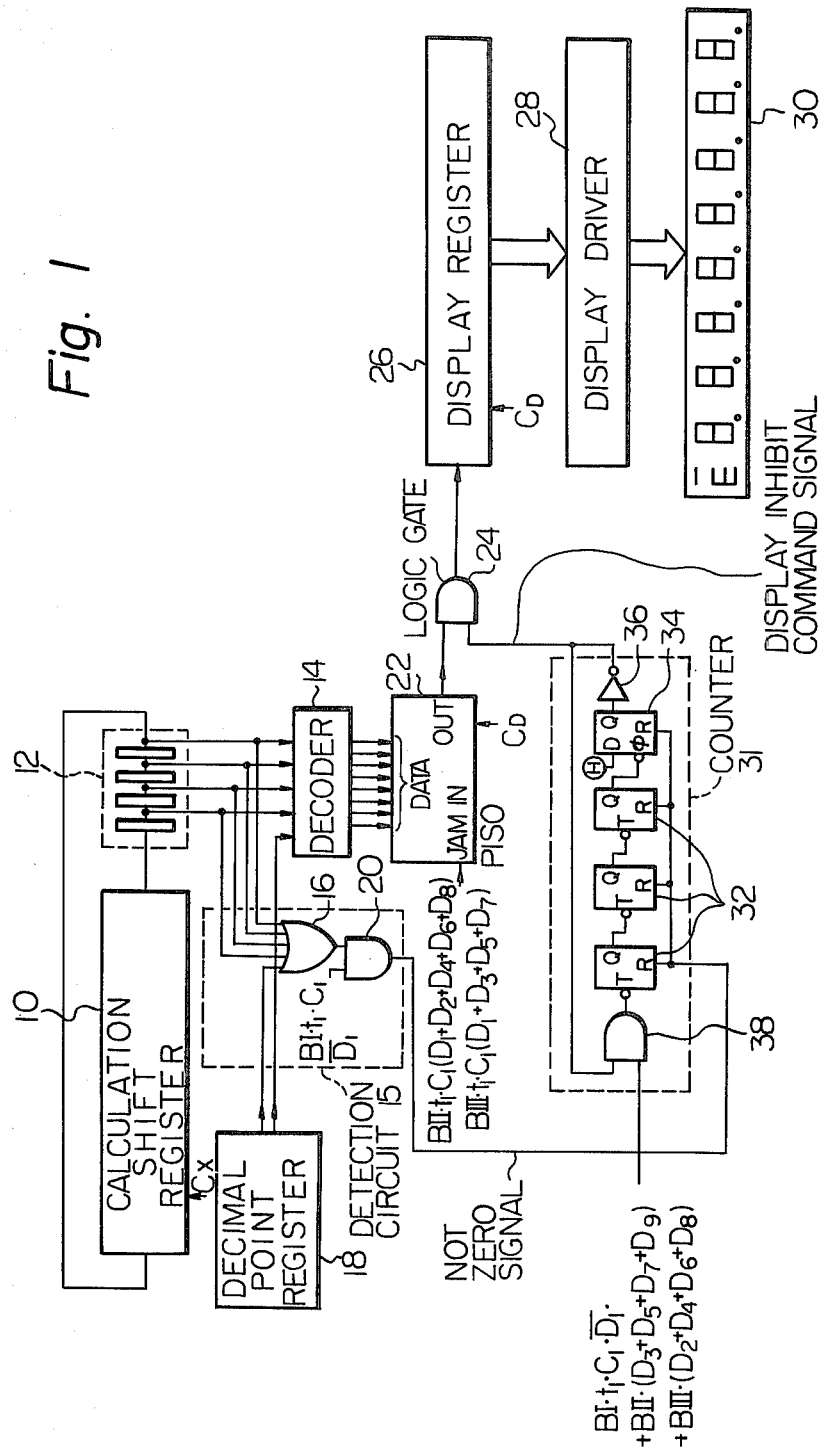
FIG. 1 is a general block diagram of an embodiment of the zero suppression method of the present invention.

Referring now to FIG. 1, the general arrangement of an embodiment of the present invention is shown therein in block diagram form. The digits of data to be displayed are stored in a calculation shift register 10, and are circulated in a loop comprising shift register 10, a 4-bit shift register 12 connected to the output of calculation shift register 10, and from the output of 4-bit shift register 10 back to the input of calculation shift register 10. This shift circulation is performed in response to a shift clock signal $C_x$.

Figure 2:
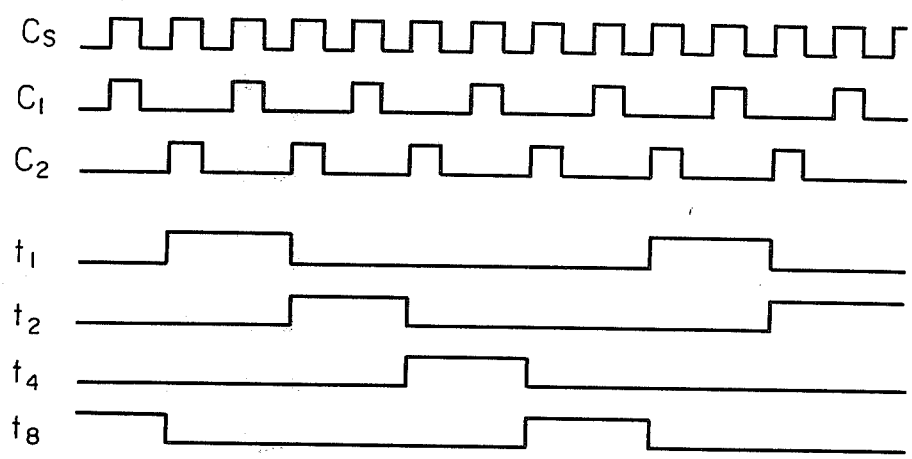
FIG. 2 and FIG. 3 are waveform diagrams illustrating the waveforms of various timing signals used in the circuit of FIG. 1.
Figure 3:
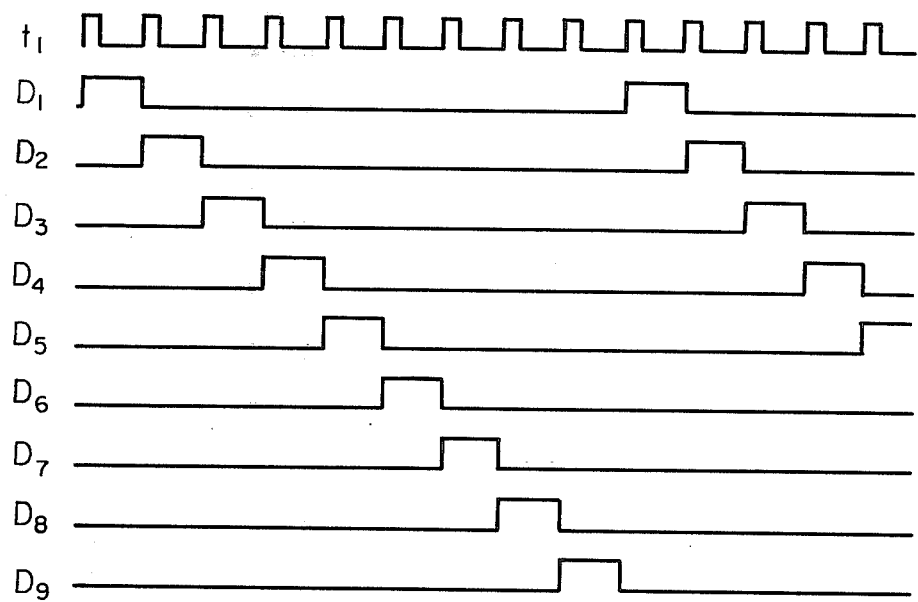

FIG. 2 and FIG. 3 are waveform diagrams showing the relationships between timing pulses used in the embodiment of FIG. 1. $C_s$ is a standard timing signal, while $C_1$ and $C_2$ are timing signals used to produce shift register clock pulses. $D_1$ to $D_9$ are digit timing signals, while $t_1$ to $t_8$ are timing signals which establish timing relationships within each digit timing signal. The period from the leading edge of $D_1$ to the falling edge of $D_9$ is one word cycle. Since calculation shift register 10 has a length which is equivalent to 32 bits, eight decimal digits of data each comprising 4 bits can be stored in calculation shift register 10.

Circulation of data around calculation shift register 10 and 4-bit shift register 12 is performed in 2 consecutive data circulation cycles, the first consisting of one word cycle BI, and the second consisting of 2 consecutive word cycles, cycle BII and cycle BIII, respectively. During cycle BI, the number of digits for which zero suppression is to be performed is detected, as described below. During data circulations BII and BIII, data are transferred from calculation shift register 10 to be stored for display. Before being thus stored, the data are converted into display segment signal form, and are then passed in serial form to a display register 26, the output of which is applied to a driver 28, which drives a digital display unit 30.

Figure 4:
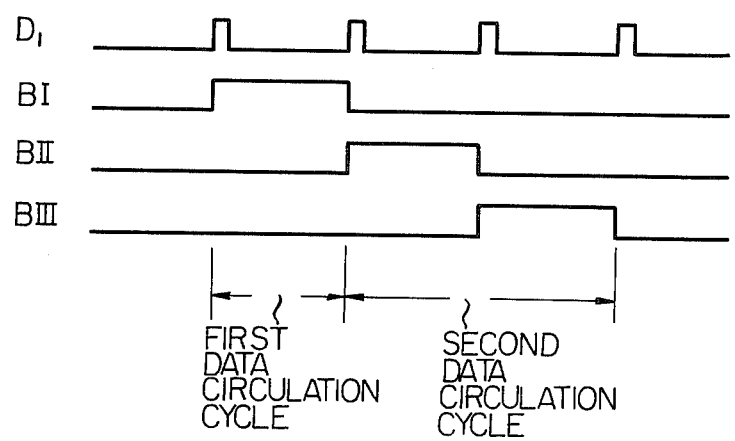
FIG. 4 is a waveform diagram illustrating the relationships between the data circulation cycles.

The relationships between data circulations BI, BII AND BIII are shown in FIG. 4. As shown in the figure, each of these circulations is one word cycle in duration. During data circulations BII and BIII, the data from calculation shift register 10 and from decimal point data register 18 are converted into 8-bit display segment signal form by decoder 14 shown in FIG. 1. Decimal point data register 18 is a register containing one digit of data. The lower three bits of this data indicate which of the digits stored in calculation shift register 10 appears immediately to the left of the decimal point. For example, if the decimal point is to be displayed immediately to the right of the first digit, then the lower 3 bits of data stored in decimal point data register 18 are 000. If the decimal point is to be displayed immediately to the right of the 8th digit, then the lower 3 bits stored in decimal point register 18 are 111 (i.e. representing 7 in binary coding).

Data are transferred from decoder 14 to display register 26 by means of register 22, which performs parallel input and serial output of data from 4-bit shift register 12. Register 22 will be referred to hereinafter as the PISO register (an abbreviation for parallel-in serial-out). When the data for a digit are arrayed in 4-bit shift register 12 during data circulation cycle BII or BIII, then a clock signal pulse designated as JAM IN is applied to PISO register 22 causing the 8 bits of display segment signal data for that digit to be read into register 22 in parallel form. The timing of the JAM IN signal is during the first part of the digit signal for the digit concerned, i.e. to read in the first digit, the timing of the JAM IN signal is $D_2C_1t_1$ during data circulation BII. To read in the 8th digit from calculation register 10, the timing of the JAM IN signal is $D_7C_1t_1$ during the BIII data circulation. In other words, the data bits representing the first digit are arrayed in parallel at the output of 4-bit shift register 12 at timing $D_2C_1t_1$, and the data bits representing the 8th digit are arrayed at the output of shift register 12 at the timing $D_7C_1t_1$. Thus, the 8 bits of display segment data corresponding to these digits also appear at the output of decoder circuit 14 at the same timings, and so are correctly read into PISO register 22 at the correct timings by the JAM IN signal.

Logic gate 24 consisting of an AND gate in the present embodiment, is connected to the output of PISO register 22. The display segment data for each digit is transferred in serial form from PISO register 22 to display register 26 through logic gate 24. Transfer of display segment data through logic gate 24 is controlled by a display inhibit command signal applied to an input of logic gate 24. The display inhibit command signal is the inverted output of counter circuit 31. When the display inhibit command signal is at the "H" level, then display segment data is transferred through logic gate 24 to the display register 26, causing the corresponding digit or decimal point to be displayed. When the display inhibit command signal is at the "L" level, then the transfer of the display segment data through logic gate 24 to the display register 26 is inhibited, since the logic gate output is held at the "L" level. Thus, display of the digit corresponding to that display segment data is suppressed.

When the display segment data for one digit has been transferred to display register 26, then the display segment data for the next digit is read into PISO register 22 from decoder 14, and this is then transferred in serial form through logic gate 24 or is inhibited from being transferred, if display of the digit is to be suppressed. In this way, the data for the digits to be displayed, held in calculation register 10, are sequentially transferred to display register 26.

Figure 5:
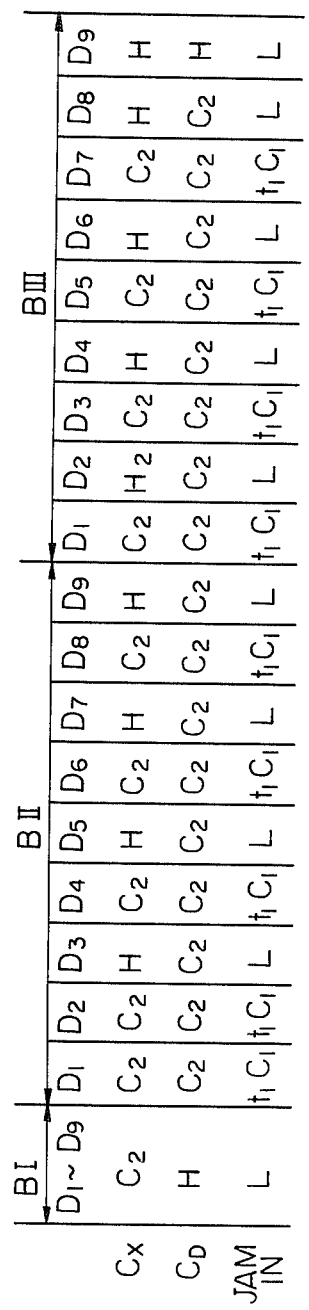
FIG. 5 is a timing diagram illustrating the timing relationships between clock pulses applied to the calculation shift register and the display register.

The relationships between the clock signal $C_x$ applied to calculation shift register 10, clock signal $C_d$ applied to display register 26 and to PISO register 22, and the JAM IN signal applied to PISO register 22, are as shown in FIG. 5. As shown, clock signals $C_x$ and $C_d$ are produced from clock signal $C_2$, but are periodically halted by being held at the "H" level. The JAM IN signal, on the other hand, is generated from the $t_1C_1$ clock signal and is periodically halted by being held at the "L" level. During data circulation cycle BI, clock pulses are only applied to calculation shift register 10, in order to detect the number of digits for which zero suppression is to be performed. During cycle BI, no shifting takes place in display register 26 or PISO register 22. During data circulation cycle BII, the first digit of data stored in calculation shift register 10 is arrayed at the outputs of 4-bit shift register 12 at timing $D_2t_1C_1$. Also during this timing, if the decimal point is to be displayed immediately to the right of the first digit, then an "H" level output is produced from decimal point register 18, and is input to decoder 14. When the JAM IN signal is applied to PISO register 22 at timing $D_2t_1C_1$, then the 8 bits of parallel data representing the display segment data for the first digit and the decimal point (if present) are read into PISO register 22. Since it is necessary to transfer 8 bits of display segment data, two digit signal timings, i.e. $D_2$ and $D_3$ are necessary to transfer the display segment data for one digit. During digit timing $D_3$, the data stored in calculation shift register 10 is not shifted. During digit timing $D_4$, the data in calculation shift register 10 is again shifted and the second digit data bits become arrayed at the outputs of 4-bit shift register 12 at timing $D_4t_1C_1$, and is converted to display segment data and read into PISO register 22 at this timing. Successive digits are successively transferred in this way, with the 8th digit being read into PISO register 22 during timing $D_7$ of the BIII data circulation cycle.

During data circulation cycle BI, detection circuit 15 sequentially checks each of the sets of 4 bits representing the digits as they appear at the outputs of 4-bit shift register 12. If at least one of the outputs of 4-bit shift register 12 is at the "H" level during a particular digit timing, then an "H" level output is produced by detection circuit 15 during that digit timing, to indicate that the digit concerned is not zero. This output is called the NOT ZERO signal. If all of the outputs of 4-bit shift register 12 are zero during a particular digit timing, and if an "L" level output appears from the output of decimal point register 18 during that digit timing, indicating that the decimal point is not to be displayed to the right of the zero digit concerned, then detection circuit 15 produces an "L" level output signal at that digit timing. However, if all of the outputs from 4-bit shift register 12 are at the "L" level, and if a "H" level signal is produced from decimal point register 18 to indicate that the digit is a zero which is to be displayed immediately to the left of the decimal point, then an "H" level output is produced by detection circuit 15. The "NOT ZERO" signal is applied to reset terminals of flip-flops in counter circuit 31.

Figure 6:
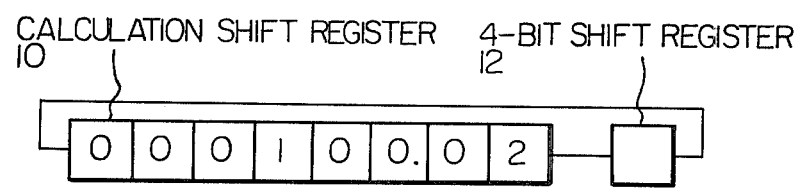
FIG. 6 is a timing diagram illustrating the timing relationships between the counter contents at various stages of the data circulation cycles.

Counter circuit 31 is used to count the number of digits for which zero suppression is required. The way in which zero suppression is performed through counter 31 will be described with reference to FIG. 6. In FIG. 6 it is assumed for the purpose of illustrating the operation, that the calculation shift register contains the data corresponding to digits 000100.02. In this case, the first three zeros of the data are non-significant, and are to be suppressed. As shown in FIG. 1, counter 31 is incremented during cycle BI by one count at timing $t_1C_1$, during every digit timing except $D_1$, by the input $BI \cdot t_1 C_1 \overline{D}_1$ to AND gate 38. Thus, counter 32 is incremented each time the data in calculation shift register 10 is shifted by one digit. Also, each time an "H" level NOT ZERO signal is output from detection circuit 15, counter 31 is reset. For the example shown in FIG. 6, during digit timing $D_2$, four bits representing the first digit, with a value of 2, appear at the output of 4-bit shift register 12. Since this is not zero, counter 31 is reset by the NOT ZERO signal from detection circuit 15. During digit timing $D_3$, since a zero digit appears at the outputs of 4-bit shift register 4, the counter 31 is not reset and is incremented by one. During digit timing $D_4$ the output of shift register 12 represents a zero digit, and counter 31 is incremented by one. During digit timing $D_4$, the third digit appears at the output of 4-bit shift register 12. This is a zero digit, but appears immediately to the left of the decimal point, and so an "H" level output is applied from decimal point register 18 to detection circuit 15, causing an "H" level NOT ZERO signal to be output from detection circuit 15. Counter 31 is thus reset.

The same process is repeated for each of the digits during data circulation cycle BI. During data digit timings $D_7$, $D_8$ and $D_9$, no NOT ZERO signal is generated by detection circuit 15, and so counter 31 is incremented by one during each of these timings. Thus, at the end of data circulation cycle BI, a count of 3 is stored in counter 31, as indicated by "Counter contents" in FIG. 6.

During data circulation cycles BII and BIII, counter 31 is incremented by one each time the transfer of one digit from calculation shift register 10 to display register 26 has been completed. During these circulation cycles no NOT ZERO signal is produced by detection circuit 15, since input $BI \cdot t_1 C_1 \overline{D}_1$ applied to AND gate 20 in detection circuit 15 is at the "L" level continuously. Since one digit is transferred to the display register during two digit timings, as shown in FIG. 6, counter 31 is also incremented once for every two digit timings (i.e. $D_3D_2$, $D_4D_5$, etc.). When the count in counter circuit 31 reaches the number of digits stored in calculation shift register 10, (which is 8 digits for the embodiment being described), then an "L" level display inhibit command signal is output from counter 31 and applied to logic gate 24, thereby inhibiting the transfer of the display segment data for the non-significant zero digits.

The first digit stored in calculation register 10 is transferred to display register 26 during digit timings $D_2$ and $D_3$, as 8 bits of segment display data, at the beginning of data circulation cycle BII. At the end of this $D_3$ timing, counter 31 is incremented so that its count is increased to 4, as shown in FIG. 6. During the next digit timings, $D_4$ and $D_5$, the second digit data is transferred to display register 26, and the counter is incremented at the end of timing $D_5$, so that the count value increases to 5. During digit timings $D_6$ and $D_7$ the third digit, and during $D_8$ and $D_9$ the fourth digit, are transferred to display register 26, with the counter being incremented by one count at the end of timings $D_7$ and $D_9$. Thus, at the end of the BII data circulation cycle the first four digits of data have been transferred from calculation shift register 10 to display register 26, as sets of 8-bit display segment data. Also at the end of the BII data circulation cycle, the count held in counter 31 has increased to 7.

The remaining four digits of data stored in calculation shift register 10 are transferred to display register 26 during data circulation cycle BIII, in a similar manner to the transfer of the first four digits. The fifth digit is transferred during digit timings $D_1$ and $D_2$ of cycle BIII, and the counter is incremented at the end of timing $D_2$, so that the count value rises to 8. Referring now to FIG. 1, it can be seen that when the count value rises to 8 in counter 31, this corresponds to the output of data-type flip-flop 34 going to the "H" logic level. This output is inverted by inverter 36 and applied to an input of AND gate 38, so that when the count held in counter 31 reaches 8, further inputs to the counter are inhibited, and the count remains at value 8. Since the output of inverter 36 is also connected to AND gate 24, and "L" level signal is applied to an input of this AND gate when counter 31 reaches a count of 8, inhibiting further transfer of segment display data to display register 26 through AND gate 24.

Referring again to FIG. 6, it can be seen that the count in counter 31 remains at 8 after the display segment data for the fifth digit has been transferred to display register 26. Since the output of AND gate 24 is thereby held at the "L" level after the fifth digit has been transferred, display of the sixth, seventh and eighth digits is suppressed, and 100.02 will be displayed. Thus, suppression of the nonsignificant leading zeros is achieved.

The function of the signal applied to detection circuit 15 from decimal point register 18 can be illustrated by assuming that the data stored in calculation shift register consists of 000.10002, for example. In this case, only the leading two zero digits are to be suppressed, with the zero digit to the left of the decimal point being displayed for the purposes of display clarity. Here, referring again to FIG. 6, the count in counter 31 will be reset to zero during digit timing $D_7$ of data circulation cycle BI. This is because decimal point register 18 applies an "H" level input to detection circuit 15 during timing $D_7$ of cycle BI to indicate that the corresponding digit stored in calculation shift register 10 is to be displayed immediately to the left of the decimal point. This causes an "H" level output to be produced by detection circuit 15 during digit timing $D_7$, thereby resetting counter 31. Thus, the count held in counter 31 at the end of data circulation cycle BI will be 2, and not 3 as for the previous example. As a result, the count held in counter 31 will not reach a value of 8 until the end of digit timing $D_4$, in data circulation cycle BIII. In this case, therefore, only the leading two zero digits, which would be transferred to display register 26 during digit timings $D_5$ $D_6$ and $D_7$ $D_8$ in data circulation cycle BIII, will be suppressed from the display. Thus, 0.10002 will be displayed.

Figure 7:
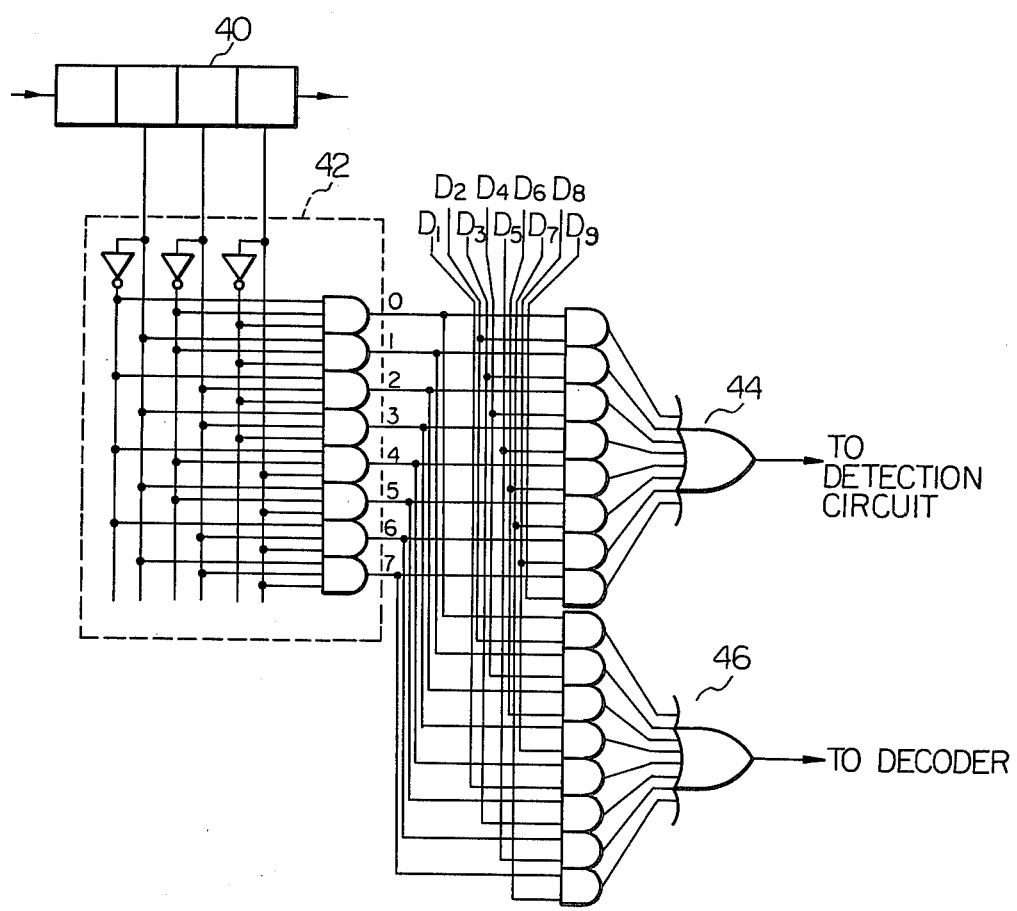
FIG. 7 is a circuit diagram of an embodiment of the decimal point data register shown in FIG. 1.

Referring to FIG. 7, an example is shown therein of an embodiment of a circuit for decimal point register 18. The lower 3 bits of data stored in shift register 40 indicate the position of the decimal point in the digits whose data is stored in calculation shift register 10. If these lower 3 bits consist of 000, for example, then this indicates that the decimal point is to be displayed immediately to the right of the first digit. If the lower 3 bits in shift register 40 are 111, then this indicates that the decimal point is to appear to the right of the eighth digit on the display.

A set of AND gates in circuit block 42 serve to convert the binary coded output data from shift register 40 into decimal form. The outputs from the AND gates in block 42 are encoded with digit timing pulses $D_1$ to $D_9$ in two sets of AND and OR gates, 44 and 46. The output from AND-OR gates 44 is applied to detection circuit 15, and is synchronized with the digit timing of the digit which is to appear immediately to the left of the decimal point. For example, if the decimal point is to be displayed to the right of the first digit, then the output from 44 has the same timing as digit timing pulse $D_2$. If the decimal point is to appear to the right of the eighth digit, then the output from 44 has the same timing as digit timing pulse $D_9$.

A second set of AND-OR gates 46 produce a signal which is synchronized with the timing at which the data for the digit which is to appear immediately to the left of the decimal point is applied to PISO register 22. For example, if the decimal point is to be displayed immediately to the right of the first digit, then the output from AND-OR gates 46 is produced at digit timing $D_2$. If the decimal point is to appear immediately to the right of the eighth digit, then the output from 46 is produced at timing D$_7$. This output signal is applied to an input of decoder 14, and causes a display segment signal for the decimal point to be produced by decoder 14 during the appropriate data circulation cycle, BII or BIII. This data is produced during the digit timings in which the display segment for the digit appearing to the left of the decimal point is output from decoder 14.

From the above description, it will be apparent that the method of the present invention enables a significant reduction to be achieved in the number of circuit elements required to perform the zero suppression function.

What is claimed is:

1. An electronic device having display means for display of data in digital form, comprising:

storage circuit means for storing said data;

detection circuit means coupled to an output terminal of said storage circuit means for detecting a non-significant zero value digit in said data and producing an output signal indicative of said zero value digit;

counter circuit means responsive to said output signal from said detection circuit means for counting the number of non-significant zero value digits in said data and producing a display inhibit command signal indicative of said zero value digit; and gate circuit means operative to transfer said data to said display means which consequently display said data and responsive to said display inhibit command signal for inhibiting transfer of parts of said data corresponding to said zero value digit to said display means for thereby causing said display means to suppress display of said non-significant zero value digits.

2. An electronic device as claimed in claim 1, and further comprising parallel-to-serial conversion circuit means coupled between said storage circuit means and said gate circuit means.

3. An electronic device having data display means for displaying data in digital form, comprising:

storage circuit means for storing and circulating said data;

detection circuit means coupled to an output of said storage circuit means for detecting a zero value digit in said data during a first circulation of said data in said storage circuit means and producing an output signal indicative of said zero value digit;

counter circuit means responsive to said output signal for counting the number of non-significant zero value digits in said data during said first circulation of said data to provide a display inhibit command signal indicative of said non-significant zero value digit; and gate circuit means coupled between said storage circuit means and said data display means for transferring parts of said data corresponding to significant digits during a second circulation of said data in said storage circuit means, and responsive to said display inhibit command signal to inhibit transfer of parts of said data corresponding to said non-significant zero value digits during said second circulation of said data to said data display means whereby display of said non-significant zero value digits is suppressed.

4. An electronic device according to claim 3, further comprising register means for storing information indicative of a digit of said data in said storage circuit means to be displayed immediately to the left of a decimal point, said information in said register means being applied to said detection circuit means, whereby said output signal from said detection circuit means indicative of said zero value digit is inhibited if said zero value digit is to be displayed immediately to the left of a decimal point.

5. An electronic device according to claim 3, further comprising parallel-to-serial conversion circuit means coupled between said gate circuit means and said output of said storage circuit means for transferring said data from said storage circuit means to said gate circuit means in serial form.

6. An electronic device according to claim 5, further comprising a source of first clock pulses being applied to an input terminal of said counter circuit means, said first clock pulses being produced during said first circulation of said data in said storage circuit means, whereby a count in said counter circuit means is incremented by each of said first clock pulses if the corresponding digit of said data is a zero value digit.

7. An electronic device according to claim 6, further comprising a source of second clock pulses being applied to an input terminal of said counter circuit means, said second clock pulses being produced during said second circulation of said data in said storage circuit means, whereby a count in said counter circuit means is incremented by each of said second clock pulses and whereby said display inhibit command signal is produced by said counter circuit means when a predetermined count value is attained in said counter circuit means, said display inhibit command signal being applied to said gate circuit means to inhibit further transfer of said data by said gate circuit means to said data display means.

* * * * *